US010654964B2

(12) United States Patent
Brennan et al.

(10) Patent No.: US 10,654,964 B2
(45) Date of Patent: May 19, 2020

(54) COMPOSITIONS COMPRISING POLYETHER-URETHANE-UREA ADDITIVES FOR BLOCK RESISTANCE AND OPEN TIME

(71) Applicants: Rohm and Haas Company, Collegeville, PA (US); Dow Global Technologies LLC, Midland, MI (US)

(72) Inventors: David J. Brennan, Midland, MI (US); Gregoire Cardoen, Collegeville, PA (US); Jonathan DeRocher, Coopersburg, PA (US); John J. Rabasco, Allentown, PA (US); Antony K. Van Dyk, Blue Bell, PA (US); Kimy Yeung, Phoenixville, PA (US)

(73) Assignees: Dow Global technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 16/309,291

(22) PCT Filed: Jun. 27, 2017

(86) PCT No.: PCT/US2017/039415
§ 371 (c)(1),
(2) Date: Dec. 12, 2018

(87) PCT Pub. No.: WO2018/009370
PCT Pub. Date: Jan. 11, 2018

(65) Prior Publication Data
US 2019/0202964 A1 Jul. 4, 2019

Related U.S. Application Data

(60) Provisional application No. 62/358,224, filed on Jul. 5, 2016.

(51) Int. Cl.
| C08G 18/28 | (2006.01) |
| C08G 18/48 | (2006.01) |
| C08G 18/64 | (2006.01) |
| C09D 175/04 | (2006.01) |
| C09D 5/02 | (2006.01) |
| C08G 18/66 | (2006.01) |
| C08G 18/22 | (2006.01) |
| C08G 18/75 | (2006.01) |
| C08G 18/73 | (2006.01) |
| C08G 18/79 | (2006.01) |
| C08G 18/32 | (2006.01) |
| C09D 7/45 | (2018.01) |

(52) U.S. Cl.
CPC ......... *C08G 18/283* (2013.01); *C08G 18/227* (2013.01); *C08G 18/3228* (2013.01); *C08G 18/4812* (2013.01); *C08G 18/4833* (2013.01); *C08G 18/6484* (2013.01); *C08G 18/6685* (2013.01); *C08G 18/73* (2013.01); *C08G 18/758* (2013.01); *C08G 18/792* (2013.01);

*C09D 5/024* (2013.01); *C09D 7/45* (2018.01); *C09D 175/04* (2013.01)

(58) Field of Classification Search
CPC .................. C08G 18/4812; C08G 18/4833
See application file for complete search history.

(56) References Cited

U.S. PATENT DOCUMENTS

| 4,079,028 | A | 3/1978 | Emmons et al. |
| 4,411,819 | A | 10/1983 | Panek et al. |
| 4,426,485 | A | 1/1984 | Hoy et al. |
| 4,762,857 | A | 8/1988 | Bollin, Jr. et al. |
| 4,839,164 | A | 6/1989 | Smith |
| 5,026,566 | A | 6/1991 | Roser |
| 5,310,851 | A | 5/1994 | Lau |
| 5,340,394 | A | 8/1994 | Elsamanoudi |
| 5,463,101 | A | 10/1995 | Reierson |
| 5,496,908 | A | 3/1996 | Bostrom et al. |
| 5,543,513 | A | 8/1996 | Mandai et al. |
| 6,162,863 | A | 12/2000 | Ramalingam |
| 6,476,121 | B1 | 11/2002 | Kadambande et al. |
| 6,762,230 | B2 | 7/2004 | Brandenburger et al. |
| 7,238,645 | B1 | 7/2007 | Chow et al. |
| 7,381,796 | B2 | 6/2008 | Roser |
| 7,705,082 | B2 | 4/2010 | Porzio et al. |
| 7,741,402 | B2 | 6/2010 | Bobsein et al. |
| 8,231,925 | B2 | 7/2012 | Ganesan et al. |
| 8,383,198 | B2 * | 2/2013 | Keary .................... A61K 9/501 427/213.3 |
| 8,444,758 | B2 | 5/2013 | Stockl et al. |
| 8,822,580 | B2 | 9/2014 | Korenkiewicz et al. |
| 9,745,492 | B2 | 8/2017 | Bohling et al. |

(Continued)

FOREIGN PATENT DOCUMENTS

| DE | 4417947 A1 | 11/1995 |
| EP | 3181589 A1 | 6/2017 |

(Continued)

OTHER PUBLICATIONS

Desmodur N 3600 by Covestro (Year: 2019).*
Technical Data Sheet of TRITON X-405 surfactant (Year: 2019).*

*Primary Examiner* — Wenwen Cai
(74) *Attorney, Agent, or Firm* — Karl E. Stauss; Cantor Colburn LLP

(57) ABSTRACT

A composition comprising: (a) a hydrophilic polyurethane comprising polymerized units of: (i) a water-soluble polyol having hydroxyl functionality from two to four and a weight-average molecular weight from 800 to 16,000; and (ii) an aliphatic polyisocyanate having isocyanate functionality from two to six; wherein polymerized ethylene oxide units comprise at least 85 wt % of said hydrophilic polyurethane; and at least one of: (b) a saccharide having at least 5 hydroxyl groups and $M_w$ from 300 to 4,000; (c) a dispersant polymer having $M_w$ from 700 to 50,000 and from 10 to 55 wt % polymerized residues of $C_3$-$C_6$ carboxylic acid monomer and (d) a surfactant having HLB>11 and 12 to 100 polymerized units of ethylene oxide.

11 Claims, No Drawings

(56) References Cited

U.S. PATENT DOCUMENTS

| | | |
|---|---|---|
| 2006/0016153 A1 | 1/2006 | King |
| 2007/0082976 A1 | 4/2007 | Bauer et al. |
| 2007/0155880 A1 | 7/2007 | Bobsein et al. |
| 2007/0293625 A1* | 12/2007 | Sauer .................. C08G 18/227 524/589 |
| 2008/0103237 A1 | 5/2008 | Strepka et al. |
| 2009/0076202 A1 | 3/2009 | Seibold et al. |
| 2009/0186972 A1 | 7/2009 | Zong et al. |
| 2010/0280162 A1 | 11/2010 | Stesikova et al. |
| 2011/0313053 A1 | 12/2011 | Munzenberg et al. |
| 2012/0004351 A1 | 1/2012 | Huang et al. |
| 2012/0101223 A1* | 4/2012 | Rabasco ................ C08G 18/10 524/590 |
| 2012/0226075 A1 | 9/2012 | Leutfeld et al. |
| 2012/0322936 A1* | 12/2012 | Li .......................... C08G 18/12 524/500 |
| 2013/0158194 A1 | 6/2013 | Bobsein et al. |
| 2013/0281639 A1 | 10/2013 | Rabasco et al. |
| 2014/0011967 A1 | 1/2014 | Rabasco et al. |
| 2014/0135468 A1 | 5/2014 | Freeman et al. |
| 2014/0205530 A1 | 7/2014 | Guillot et al. |
| 2015/0073080 A1 | 3/2015 | Wu et al. |
| 2015/0119525 A1 | 4/2015 | Rabasco et al. |
| 2015/0133604 A1 | 5/2015 | Zong et al. |
| 2017/0155880 A1 | 6/2017 | Nagata et al. |
| 2017/0183535 A1* | 6/2017 | Yeung .................... C09D 5/024 |

FOREIGN PATENT DOCUMENTS

| | | |
|---|---|---|
| EP | 3181590 A1 | 6/2017 |
| JP | 1056602 | 3/1989 |
| WO | 1999010413 A2 | 3/1999 |
| WO | 2002070024 A1 | 9/2002 |
| WO | 2007128388 A3 | 1/2008 |
| WO | 2014146958 A1 | 9/2014 |

* cited by examiner

COMPOSITIONS COMPRISING POLYETHER-URETHANE-UREA ADDITIVES FOR BLOCK RESISTANCE AND OPEN TIME

FIELD OF THE INVENTION

The present invention relates to compositions containing polyether-urethane-urea (PEUU) additives which improve open time in latex paints without having a substantial negative effect on block resistance.

BACKGROUND OF THE INVENTION

Hydrophobically modified urethane thickeners (HEURs), which are produced from polyisocyanates and/or diisocyanates and glycols, are known as water soluble polymers containing hydrophobic groups. They are classified as associative thickeners and frequently used in latex paint formulations, where the hydrophobic groups adsorb to latex particle surfaces, giving rise to viscosity increase and desirable rheological characteristics over a wide range of shear rates. For example, U.S. Pat. No. 4,079,028 discloses HEUR thickeners.

However, open time, defined as the period of time in which a freshly applied wet paint film can be repainted over without impeding film formation or changing the physical appearance, is often problematic in latex paints.

It would therefore be an advance in the art of latex paint formulation to improve open time without producing a substantial negative effect on block resistance.

SUMMARY OF THE INVENTION

The present invention is directed to a composition comprising: (a) a hydrophilic polyurethane comprising polymerized units of: (i) a water-soluble polyol having hydroxyl functionality from two to four and a weight-average molecular weight from 800 to 16,000; and (ii) an aliphatic polyisocyanate having isocyanate functionality from two to six; wherein polymerized ethylene oxide units comprise at least 85 wt % of said hydrophilic polyurethane; and at least one of: (b) a saccharide having at least 5 hydroxyl groups and $M_w$ from 300 to 4,000; (c) a dispersant polymer having $M_w$ from 700 to 50,000 and from 10 to 55 wt % polymerized residues of $C_3$-$C_6$ carboxylic acid monomer and (d) a surfactant having HLB>11 and 12 to 100 polymerized units of ethylene oxide.

DETAILED DESCRIPTION OF THE INVENTION

All percentages are weight percentages (wt %) and all temperatures are in ° C., unless otherwise specified. All operations are performed at room temperature (20-25° C.) unless otherwise specified. As used herein the term "(meth)acrylic" refers to acrylic or methacrylic. The term "(meth)acrylamide" refers to acrylamide (AM) and/or methacrylamide (MAM). A "$C_3$-$C_6$ carboxylic acid monomer" is a mono-ethylenically unsaturated compound having one or two carboxylic acid groups, e.g., (meth)acrylic acid, maleic acid, fumaric acid, itaconic acid, maleic anhydride, crotonic acid, maleic acid monoamide, etc.

Acrylic monomers include (meth)acrylic acids and their $C_1$-$C_{25}$ alkyl, aralkyl or hydroxyalkyl esters, crotonic acid, itaconic acid, fumaric acid, maleic acid, maleic anhydride, (meth)acrylamides, (meth)acrylonitrile and alkyl or hydroxyalkyl esters of crotonic acid, itaconic acid, fumaric acid, maleic acid and maleic acid monoamide. Styrenic monomers include styrene, α-methylstyrene, 4-methylstyrene, 2-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 4-t-butylstyrene, 2,4-dichlorostyrene, 2,6-dichlorostyrene and 1-vinylnapthalene; preferably styrene and α-methylstyrene.

As used herein, the term "water-soluble polyol" refers to one or more polyethylene oxides, water-soluble polyethylene oxide/polypropylene oxide copolymers, water-soluble polyethylene oxide/polybutylene oxide copolymers, water-soluble polyethylene oxide/polypropylene oxide/polybutylene oxide terpolymers and water-soluble polyols comprising polymerized units of $C_3$-$C_8$ triols (e.g., glycerol, trimethylolpropane) and polymerized units of at least one of ethylene oxide, propylene oxide and butylene oxide. As used herein, the term "water-soluble" means soluble in water at least to the extent of 10 wt %, based on total weight of solution (preferably 20 wt %). A used herein, the term "polyisocyanate" refers to an isocyanate source having at least two isocyanate groups per molecule. The term "aliphatic polyisocyanate" refers to non-aromatic polyisocyanates, i.e., acyclic aliphatic as well as cyclic aliphatic polyisocyanates. A "saccharide" is a simple sugar (monosaccharide) or a polysaccharide comprising two or more monosaccharide units bound together by glycosidic linkages. Saccharides may be functionalized by substitution on their hydroxyl groups to convert the hydroxyls to other functional groups, e.g., by reaction with phenyl glycidyl ether.

Preferred water-soluble polyols have hydroxyl functionality from two to three, preferably two. Preferably, water-soluble polyols have a weight average molecular weight ($M_w$) in the range of from 900 to 16,000 Daltons, preferably 1,000 to 12,000, preferably 1,000 to 10,000. Preferred water-soluble polyols include polyethylene glycols and ethoxylated glycerol. Polyethylene glycols may include up to 15 wt % polymerized units of $C_3$-$C_4$ alkylene oxides, preferably no more than 10 wt %, preferably no more than 5 wt %, preferably no more than 2 wt %. Polyethylene glycols may include ethylene oxide polymers capped on one end with a $C_1$-$C_4$ alkyl group, preferably methyl. Preferably, polyethylene glycols have a weight average molecular weight ($M_w$) in the range of from 4,000 to 16,000 Daltons, preferably 4,000 to 12,000, preferably 6,000 to 10,000. An example of a suitable polyethylene glycol is PEG 8000, which is commercially available as CARBOWAX™ 8000 Polyethylene Glycol (a trademark of The Dow Chemical Company or its Affiliates). $M_w$ is measured by the Size Exclusion Chromatography (SEC) method described below. Preferably, ethoxylated glycerol has $M_w$ from 800 to 1600, preferably 1000 to 1400. In one preferred embodiment, the polymer further comprises polymerized units of polyethylene glycol mono-$C_1$-$C_4$ alkyl ethers along with a polyol having hydroxyl functionality from two to three.

Preferably, the calculated log P (c Log P) for the hydrophobic, terminal, or linker portion of the hydrophilic polyurethane is from −1.5 to 4.5; preferably −1.3 to 4.3 Preferably, the hydrophilic polyurethane thickener also comprises urea and/or biuret and/or allophanate groups. For example, urea groups form when reactants such as amines or water are used during the preparation of the hydrophilic polyurethane.

Preferably, the water-soluble polyol has at least 90 wt % polymerized units of ethylene oxide, preferably at least 92 wt %, preferably at least 94 wt %, preferably at least 95 wt %; preferably no more than 99.5 wt %, preferably no more than 99 wt %, preferably no more than 98.5 wt %. The percentage of polymerized units of ethylene oxide is calculated on a solids basis, i.e., the dry weight of the polymer without considering non-reactive solvents.

Preferably, the hydrophilic polyurethane polymer comprises from 0.5 to 5 wt % polymerized units of water-soluble polyols comprising polymerized units of a $C_3$-$C_8$ triol (e.g., glycerol, trimethylolpropane) and at least one of ethylene oxide, propylene oxide and butylene oxide; preferably from 1 to 4 wt %. Preferably, the water-soluble polyol has at least 75 wt % units of ethylene oxide, preferably at least 85 wt %.

Preferably, polyisocyanates have isocyanate functionality from two to five, preferably from two to four. Examples of suitable diisocyanates include 1,4-tetramethylene diisocyanate, 1,6-hexamethylene diisocyanate (HDI) and its oligomers (e.g., 1,3,5-tris(6-isocyanatohexyl) 1,3,5-triazine-2,4,6 (1H,3H,5H)-trione (HDI trimer) and IPDI trimer), 2,2,4-trimethyl-1,6-diisocyanatohexane, 1,10-decamethylene diisocyanate, 4,4'-methylenebis(isocyanatocyclohexane) (H12MDI), 2,4'-methylenebis(isocyanatocyclohexane), 1,4-cyclohexylene diisocyanate and 1-isocyanato-3-isocyanatomethyl-3,5,5-trimethylcyclohexane (IPDI).

The product of percent polymerized ethylene oxide units and polyethylene oxide mean molecular weight unexpectedly has been found to correlate with improved open time performance in the polyurethanes of the present invention. The polyethylene oxide (PEO) mean molecular weight is the weight average of the molecular weights ($M_w$) of the polyethylene oxide units in the polyurethane. For example, a polyurethane having equal weights of polyethylene oxides having $M_w$ values of 8,000 and 2,000 has a polyethylene oxide mean molecular weight of 5,000. Preferably, the product of percent polymerized ethylene oxide units and polyethylene oxide mean molecular weight is at least 4,400, preferably at least 4,500, preferably at least 5,000, preferably at least 6,000; preferably no greater than 12,000, preferably no greater than 10,000, preferably no greater than 9,000.

The hydrophilic polyurethane may be prepared by contacting together under reactive conditions the water-soluble polyol, the aliphatic polyisocyanate and optionally, one or more of a diol mono-$C_1$-$C_4$ alkyl ether (e.g., a polymer of one or more of ethylene glycol, propylene glycol and butylene glycol end-capped with a lower alkyl group, preferably methyl) and a diamine, preferably an aliphatic diamine. Preferably, at least one of the diamine and diol mono-$C_1$-$C_4$ alkyl ether is water soluble. Preferably, the diamine is a $C_2$-$C_6$ diamine, preferably $C_2$-$C_4$, preferably ethylene diamine. The order of reactant charging may be varied as generally known for the synthesis of urethane polymers. For example, all of the reactants may be reacted together in a single synthesis step, or the reactants may be reacted in any synthetic sequence to achieve the desired final polymer. As is well known in the art of step growth polymerization to produce urethane polymers, the molar equivalent ratio of the ingredients is used to control such properties like molecular weight.

Preferably, $M_w$ of the hydrophilic polyurethane polymer is at least 10,000, preferably at least 16,000, preferably at least 20,000, preferably at least 30,000; preferably no greater than 2,000,000, preferably no greater than 1,500,000, preferably no greater than 500,000, preferably no greater than 200,000.

Hydrophilic polyurethanes produced as described herein are not merely urethane polymers, but can further include combinations of allophanate branch points in the polymer backbone and urea linkages. The polymers may further include primary amine end groups or biuret branch points in the polymer backbone or a combination thereof.

Preferably, the saccharide has at least 5 hydroxyl groups, preferably at least 8. Preferably, the saccharide has at least one hydroxyl group per saccharide ring, preferably at least two. Preferably, the saccharide is a polysaccharide, preferably one having from 2 to 20 polymerized monosaccharides. Preferably, The saccharide has $M_w$ at least 340, preferably at least 500; preferably no more than 3,000, preferably no more than 2,000. Especially preferred saccharides include, e.g., maltodextrin and trehalose. Maltodextrin has the following structure

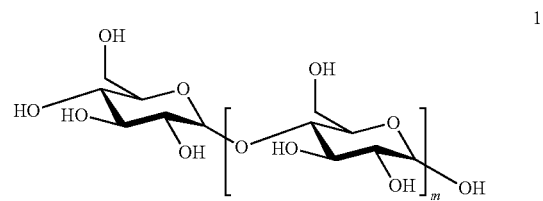

wherein m is from 1 to 30. Preferably, m is at least 5, preferably at least 11, preferably at least 15; preferably no more than 24, preferably no more than 20. Preferably, no more than two hydroxyl groups on each monosaccharide unit are functionalized, preferably no more than one, with the number being an arithmetic average.

Preferably, the surfactant has HLB of at least 11.5, preferably at least 12; preferably no more than 20, preferably no more than 16. Preferably, the surfactant has at least 13 polymerized units of ethylene oxide, preferably at least 14; preferably no more than 50, preferably no more than 30, preferably no more than 25, preferably no more than 20. In a preferred embodiment, the surfactant is a nonionic surfactant.

Preferably, the dispersant polymer has $M_w$ of at least 1,500, preferably at least 2,500, preferably at least 3,500, preferably at least 4,500; preferably no greater than 30,000, preferably no greater than 20,000, preferably no greater than 10,000. Preferably, the dispersant polymer comprises from 45 to 90 wt % polymerized residues of acrylic monomers, styrenic monomers, diisobutylene or a combination thereof; preferably at least 50 wt %, preferably at least 55 wt %, preferably at least 60 wt %; preferably no more than 85 wt %, preferably no more than 80 wt %. Preferably, at least 75 wt % of the acrylic monomers are selected from $C_2$-$C_{18}$ alkyl (meth)acrylates and benzyl (meth)acrylate, preferably at least 85 wt %; preferably $C_4$-$C_{12}$ alkyl (meth)acrylates or benzyl (meth)acrylate.

Preferably, the composition comprises from 20 to 80 wt % of the hydrophilic polyurethane; preferably at least 25 wt %, preferably at least 30 wt %, preferably at least 35 wt %; preferably no more than 75 wt %, preferably no more than 70 wt %, preferably no more than 65 wt %. Preferably, the composition comprises from 20 to 80 wt % of the nonionic surfactant; preferably at least 25 wt %, preferably at least 30 wt %, preferably at least 35 wt %; preferably no more than 70 wt %, preferably no more than 60 wt %, preferably no more than 50 wt %. Preferably, the composition comprises from 20 to 80 wt % of the maltodextrin; preferably at least 25 wt %, preferably at least 30 wt %, preferably at least 35 wt %; preferably no more than 70 wt %, preferably no more than 60 wt %, preferably no more than 50 wt %. Preferably, the composition comprises from 20 to 80 wt % of the dispersant polymer; preferably at least 25 wt %, preferably at least 30 wt %, preferably at least 35 wt %; preferably no more than 70 wt %, preferably no more than 60 wt %, preferably no more than 50 wt %.

The present invention is further directed to a latex paint comprising from 0.1 to 5 wt % of the composition of this invention.

Preferably, the latex paint comprises at least 0.2 wt % of the composition, preferably at least 0.3 wt %, preferably at least 0.4 wt %, preferably at least 0.5 wt %; preferably no more than 4 wt %, preferably no more than 3 wt %. Percentages are based on the entire weight of the latex paint.

Preferably, the latex paint comprises from 0.05 to 2 wt % of the hydrophilic polyurethane; preferably at least 0.1 wt %, preferably at least 0.15 wt %, preferably at least 0.2 wt %, preferably at least 0.25 wt %; preferably no more than 1.5 wt %, preferably no more than 1 wt %, preferably no more than 0.7 wt %, preferably no more than 0.5 wt %. Preferably, the latex paint comprises from 0.05 to 2 wt % maltodextrin; preferably at least 0.1 wt %, preferably at least 0.15 wt %, preferably at least 0.2 wt %, preferably at least 0.25 wt %; preferably no more than 1.5 wt %, preferably no more than 1 wt %, preferably no more than 0.7 wt %, preferably no more than 0.5 wt %. Preferably, the latex paint comprises from 0.05 to 2 wt % of a nonionic surfactant; preferably at least 0.1 wt %, preferably at least 0.15 wt %, preferably at least 0.2 wt %, preferably at least 0.25 wt %; preferably no more than 1.5 wt %, preferably no more than 1 wt %, preferably no more than 0.7 wt %, preferably no more than 0.5 wt %. Preferably, the latex paint comprises from 0.05 to 2 wt % of the dispersant polymer; preferably at least 0.1 wt %, preferably at least 0.15 wt %, preferably at least 0.2 wt %, preferably at least 0.25 wt %; preferably no more than 1.5 wt %, preferably no more than 1 wt %, preferably no more than 0.7 wt %, preferably no more than 0.5 wt %.

The present invention is further directed to a method for increasing open time in latex paint without substantial adverse effects on block resistance by adding the composition of this invention in the aforementioned amounts.

EXAMPLES

Example 1

A solution of polyethylene glycol (8200 g/mol, 75.4 g) in toluene (220 g) was dried by azeotropic distillation. After the solution was cooled to 90° C., DESMODUR N3600 (HDI trimer containing 70% trimer and smaller amounts of higher oligomers, overall NCO functionality=3.1) (1.37 g) and ethoxylated glycerol (1236 g/mol, 1.68 g) were added respectively, and the solution was stirred for 5 minutes. Bismuth octoate (0.19 g) was added to the solution, and the reaction mixture was stirred for 1 hour. The reaction mixture was cooled to room temperature, and the solvent was removed via rotary evaporation. The polymer was isolated as a white solid. 0.9 PEG8000/0.3667 N3600/0.2 Gly-EO (26). $M_n$=31,200; $M_w$=51,600 Da

Example 2

A solution of polyethylene glycol (8200 g/mol, 82.2 g) in toluene (202 g) was dried by azeotropic distillation. After the solution was cooled to 90° C., ethylene diamine (0.075 g) was added, and the solution was stirred for 5 minutes. DESMODUR N3600 (1.68 g) and ethoxylated glycerol (1236 g/mol, 2.07 g) were added respectively, and the reaction mixture was stirred for another 5 minutes. Bismuth octoate (0.21 g) was added, and the reaction mixture was stirred for 1 hour. The reaction mixture was cooled to room temperature, and the solvent was removed via rotary evaporation. The polymer was isolated as an off-white solid. 0.8 PEG8000/0.1 ethylene diamine/0.3667 N3600/0.2 Gly-EO (26). $M_n$=27,800; $M_w$=35,800 Da

Example 3

A solution of polyethylene glycol (8200 g/mol, 115.8 g) in toluene (216 g) was dried by azeotropic distillation. After the solution was cooled to 90° C., DESMODUR W (H12MDI, 11.66 g) was added, and the solution was stirred for 5 minutes. Bismuth octoate (0.19 g) was added to the solution, and the reaction mixture was stirred for 1 hour. CARBOWAX MPEG2000 (2000 g/mol, 129.1 g) was added to the stirred reaction mixture, and the mixture was stirred at 90° C. for another hour. The reaction mixture was cooled to room temperature, and the solvent was removed via rotary evaporation. The polymer was isolated as a white solid. 0.35 PEG8000/1.1 DesW//0.8 MePEG2000. $M_n$=7,300; $M_w$=13,500 Da

Example 4

A solution of polyethylene glycol (8200 g/mol, 76.6 g) in toluene (216 g) was dried by azeotropic distillation. After the solution was cooled to 90° C., DESMODUR H (HDI 4.94 g) was added, and the solution was stirred for 5 minutes. Bismuth octoate (0.19 g) was added to the solution, and the reaction mixture was stirred for 1 hour. Polyethylene glycol (8200 g/mol, 175.1 g) was added to the stirred reaction mixture, and the mixture was stirred at 90° C. for another hour. The reaction mixture was cooled to room temperature, and the solvent was removed via rotary evaporation. The polymer was isolated as a white solid. 0.35 E8000/1.1 HDI//0.8 PEG8000. $M_n$=16,500; $M_w$=34,500

Example 5

Polyethylene glycol (8200 g/mol, 1314.8 g) was mixed at 110° C. under full house vacuum in the Sigma batch melt reactor for 2 hours. After the reactor was cooled to 90° C. and purged with nitrogen, butylated hydroxytoluene (0.14 g) and ethylene diamine (1.2 g) were added respectively to the reactor, and the molten mixture was mixed for 5 minutes at 90° C. under nitrogen. DESMODUR N3600 (26.9 g) and ethoxylated glycerol (1236 g/mol, 33.0 g) were added respectively to the reactor, and the reaction mixture was mixed for an additional 5 min. Bismuth octoate (3.3 g) was added to the reactor, and the reaction mixture was mixed for 10 minutes at 90° C. The resulting molten polymer was removed from the reactor and cooled to room temperature. 0.8 PEG8000/0.1 ethylene diamine/0.3667 N3600/0.2 Gly-EO (26). $M_n$=28,000; $M_w$=36,000 Da Separations were carried out on a liquid chromatograph consisting of an Agilent 1100 Model isocratic pump and injector (Waldbronn, Germany) and Waters 214 Model differential refractometer (Milford, Mass.) operated at 40° C. System control, data acquisition, and data processing were performed using 3.1 version of Cirrus® software (Polymer Laboratories, Church Stretton, UK).

SEC separations were performed in 100 mM $NH_4OAc$ in MeOH (Optima grade from Fisher) @ 1 ml/min using SEC column set composed of three Asahipak columns (300×7.5 mm ID) packed with highly cross-linked polar gel (pore size marked as GF-310HQ, GF-510HQ and GF-710HQ, particle size 9 μm) purchased from Shoko America (Torrance, Calif.). 100 μL of sample were subjected for SEC separation.

Relative MW measurement was performed by calibration with narrow PEO standards.

Example 6 (Comparative)

A solution of polyethylene glycol (4000 g/mol, 102.6 g) in toluene (287 g) was dried by azeotropic distillation. After the solution was cooled to 90° C., ethylene diamine (0.193 g) was added, and the solution was stirred for 5 minutes. DESMODUR N3600 (4.30 g) and ethoxylated glycerol (1236 g/mol, 5.28 g) were added respectively, and the reaction mixture was stirred for another 5 minutes. Bismuth octoate (0.26 g) was added, and the reaction mixture was stirred for 1 hour. The reaction mixture was cooled to room temperature, and the solvent was removed via rotary evaporation. The polymer was isolated as a white solid. 0.8 PEG4000/0.1 ethylene diamine/0.3667 N3600/0.2 Gly-EO (26)

Example 7 (Comparative)

A solution of polyethylene glycol (4000 g/mol, 73.6 g) in toluene (220 g) was dried by azeotropic distillation. After the solution was cooled to 90° C., DESMODUR N3600 (2.74 g) and ethoxylated glycerol (1236 g/mol, 3.36 g) were added respectively, and the solution was stirred for 5 minutes. Bismuth octoate (0.38 g) was added to the solution, and the reaction mixture was stirred for 1 hour. The reaction mixture was cooled to room temperature, and the solvent was removed via rotary evaporation. The polymer was isolated as a white solid. 0.9 PEG4000/0.3667 N3600/0.2 Gly-EO (26)

|  | % | OT mins | 1 d block, $g_f$ | 1 d tack, $g_f$ | Leveling | Stain, DE Tea |
|---|---|---|---|---|---|---|
| Ex. 1 | 1 | 9.3 | 42 | 32 | 6.0 | 11.0 |
| Ex. 2 | 1 | 9.1 | 28 | 25 | 5.4 | 16.8 |
| Ex. 3 | 1 | 6.3 | 85 | 84 | 5.9 | 12.9 |
| Control | 1 | 5.1 | 65 | 87 | 6.0 | 9.7 |
| OTE-500 | 1 | 9.4 | 104 | 125 | 4.2 | 18.2 |

OT is open time; 1 day block in gram-force; 1 day tack in gram-force; test method details are described below; OTE-500 is a commercial open-time additive (RHODOLINE OTE-500 additive, Solvay, Inc.) which comprises nonionic and anionic sulfate ethoxylated tristyrylphenols; % of additive is based on entire weight of the latex paint.

While OTE-500 has good open time, it degrades block resistance, tack resistance, leveling, and stain resistance, while the polymers of this invention have good open time and less or minimal effect on block, tack, leveling, and stain compared to OTE-500. The product of Ex. 2 is found surprisingly to increase block and tack resistance compared to the control.

|  | % | OT mins |
|---|---|---|
| Ex. 1 | 2 | 10 |
| Ex. 2 | 2 | 11 |
| Ex. 3 | 2 | 9.3 |
| Ex. 4 | 2 | 12 |
| Ex. 5 | 2 | 12.3 |
| Ex. 6 | 2 | 5.0 |
| Ex. 7 | 2 | 5.7 |
| OTE-500 | 2 | 11 |

OT generally increases with increased level. However, OTE-500 often cannot even be used at 1% due to impairment of block and tack resistance, while PEU and PEUU can be used at higher level and therefore can practically increase open time compared to OTE-500.

| Ex. | % PEO | EO mean $M_w$ | PEO fraction × EO mean $M_w$ | OT (2%) |
|---|---|---|---|---|
| 1 | 98.25 | 8200 | 8057 | 10 |
| 2 | 97.96 | 8200 | 8033 | 11 |
| 3 | 95.47 | 4931 | 4708 | 9.3 |
| 4 | 98.08 | 8200 | 8042 | 12 |
| 5 | 97.96 | 8200 | 8033 | 12.3 |
| 6 | 96.00 | 4000 | 3840 | 5 |
| 7 | 96.56 | 4000 | 3862 | 5.7 |

Open time was measured in accordance with ASTM-D7488. Stain resistance studies were carried out by first applying the paint formulation to a white vinyl substrate with a 7-mil (0.18 mm) doctor blade. The film was allowed to stand for 7 days and the substrates were scanned using a calibrated flatbed scanner to obtain a baseline measurement. Stains were then applied to the dried film and allowed to set for 2 h before being subjected to the removal test: Leneta SC-1 non-abrasive media was combined with water (3:2 v/v) to form a solution. A thin film of the solution was applied to the stained coating; a non-abrasive sponge was dipped into the solution for 10 s, then contacted with the stained coating at a pressure of about 5 kPa and oscillated at 60 cycles/min (back and forth=1 cycle) for 100 s. The scrubbed substrates were rinsed with water and the stained substrates were imaged with the scanner to measure the root mean square difference in Lab coordinates between the baseline and the scrubbed stains ($\Delta E_{76}$).

Leveling drawdowns were made using a miniature analog of the Leneta Leveling Test Blade LTB-2. Drawdowns were dried horizontally under CTR conditions. Dried films were imaged and analyzed using custom-built software calibrated to mimic Leneta Drawdown Levelness Standards LS-2.

Coated samples were cured for 24 hr at 22° C. and 50% RH. A custom-built, automated, high throughput tribometer was used to measure tack. A Type 304 stainless steel ball, ⅜" (9.5 mm) in diameter, was placed on the surface of the coating using 1 N of force. This force was applied for 5 s after which the force required to remove the ball from the surface was measured.

Coated samples were cured for 24 hr at 22° C. and 50% RH. Samples were precision cut to 0.5"×0.5" (12.7×12.7 mm) with an Epilog Zing laser. Two coated samples were placed in contact with each other under a weight exerting 8 kPa of pressure for 30 min at 50° C. The force required to separate them was then measured using a TA-XT Plus Texture Analyzer.

| sample |  | wt % |  | wt % |  | wt % | OT | 1-day Block @ 50 C. | Tack 1 day | Lev. | Tea |
|---|---|---|---|---|---|---|---|---|---|---|---|
| 1 | Ex. 2 | 0.7 | malt | 0.3 |  |  | 7.9 | 56.4 | 38.7 | 5.9 | 14.9 |
| 2 | Ex. 2 | 0.7 | CA-2500 | 0.3 |  |  | 7.0 | 37.8 | 38.0 | 5.7 | 18.2 |
| 3 | Ex. 2 | 0.7 | BSU | 0.3 |  |  | 9.2 | 32.0 | 44.5 | 5.9 | 17.6 |

-continued

| sample | | wt % | | wt % | | wt % | OT | 1-day Block @ 50 C. | Tack 1 day | Lev. | Tea |
|---|---|---|---|---|---|---|---|---|---|---|---|
| 4 | Ex. 2 | 0.6 | malt | 0.2 | CA-2500 | 0.2 | 7.0 | 68.3 | 41.4 | 5.7 | 18.7 |
| 5 | Ex. 2 | 0.33 | malt | 0.33 | CA-2500 | 0.33 | 8.8 | 68.6 | 73.6 | 5.7 | 6.3 |
| 6 | Ex. 2 | 0.33 | malt | 0.33 | CA-2500 | 0.33 | 8.8 | 49.4 | 79.4 | 5.2 | 14.5 |
| 7 | Ex. 2 | 0.33 | malt | 0.33 | BSU | 0.33 | 8.0 | 68.0 | 76.0 | 5.2 | 20.8 |
| 8 | Ex. 2 | 0.6 | malt | 0.2 | CA-2500 | 0.2 | 7.0 | 42.8 | 75.8 | 5.6 | 19.6 |
| 9 | Ex. 2 | 0.6 | malt | 0.2 | BSU | 0.2 | 6.8 | 56.3 | 72.7 | 6.0 | 17.8 |
| 10 | Ex. 2 | 0.33 | malt | 0.33 | CA-2500 | 0.33 | 8.8 | 60.0 | 83.9 | 5.4 | 15.1 |
| 11 | Ex. 2 | 0.6 | malt | 0.2 | CA-2500 | 0.2 | 7.0 | 46.1 | 58.5 | 5.4 | 20.1 |
| 12 | Ex. 2 | 1 | | | | | 9.1 | 28.4 | 25.5 | 5.4 | 16.8 |
| C 1 | malt | 1 | | | | | 6.5 | 50.6 | 64.3 | 5.9 | 13.2 |
| C 2 | CA-2500 | 1 | | | | | 7.8 | 61.1 | 80.1 | 5.8 | 15.9 |
| C 3 | BSU | 1 | | | | | 9.9 | 108.4 | 110.5 | 5.5 | 20.1 |
| Ctl. | Ctl. | 0 | | | | | 5.1 | 65.2 | 87.0 | 6.0 | 9.7 |
| C 4 | OTE-500 | 1 | | | | | 9.4 | 104.3 | 124.8 | 4.2 | 18.2 |

"Lev." is leveling; "CA-2500" is OROTAN CA-2500 dispersant (copolymer of styrene, α-methylstyrene and (meth)acrylic acid; product of The Dow Chemical Company); "BSU" is SOPROPHOR BSU surfactant (tristyryl-phenol ethoxylate, ca. 16 moles EO, HLB = 12.6); "Ctl." is a control having no open-time additive at all.

The invention claimed is:

1. A composition comprising: (a) a hydrophilic polyurethane comprising polymerized units of: (i) a water-soluble polyol having hydroxyl functionality from two to four and a weight-average molecular weight from 800 to 16,000; and (ii) an aliphatic polyisocyanate having isocyanate functionality from two to six; wherein said hydrophilic polyurethane comprises at least 85 wt % of polymerized ethylene oxide units; and at least one of: (b) a saccharide having at least 5 hydroxyl groups and $M_w$ from 300 to 4,000; (c) a dispersant polymer having $M_w$ from 700 to 50,000 and from 10 to 55 wt % polymerized residues of $C_3$-$C_6$ carboxylic acid monomer; wherein the water-soluble polyol comprises: (i) a water-soluble polyethylene glycol having a weight average molecular weight from 4,000 to 10,000, and (ii) an ethoxylated glycerol having weight average molecular weight from 800 to 1,600.

2. The composition of claim 1 wherein $M_w$ of the hydrophilic polyurethane is from 10,000 to 2,000,000.

3. The composition of claim 2 wherein said hydrophilic polyurethane comprises at least 90 wt % of the polymerized ethylene oxide units.

4. The composition of claim 1 wherein the water-soluble polyol comprises: (i) a water-soluble polyethylene glycol having a weight average molecular weight from 6,000 to 10,000, and (ii) an ethoxylated glycerol having weight average molecular weight from 800 to 1,600.

5. The composition of claim 1 further comprising (d) a surfactant having HLB>11 and 12 to 100 polymerized units of ethylene oxide.

6. The composition of claim 1 wherein the hydrophilic polyurethane includes a terminal portion having a calculated log P of −1.5 to 4.5.

7. A latex paint comprising from 0.1 to 5 wt % of a composition comprising: (a) a hydrophilic polyurethane comprising polymerized units of: (i) a water-soluble polyol having hydroxyl functionality from two to four and a weight-average molecular weight from 800 to 16,000; and (ii) an aliphatic polyisocyanate having isocyanate functionality from two to six; wherein said hydrophilic polyurethane comprises at least 85 wt % of polymerized ethylene oxide units; and at least one of: (b) a saccharide having at least 5 hydroxyl groups and $M_w$ from 300 to 4,000; (c) a dispersant polymer having $M_w$ from 700 to 50,000 and from 10 to 55 wt % polymerized residues of $C_3$-$C_6$ carboxylic acid monomer; wherein the water-soluble polyol comprises: (i) a water-soluble polyethylene glycol having a weight average molecular weight from 4,000 to 10,000, and (ii) an ethoxylated glycerol having weight average molecular weight from 800 to 1,600.

8. The latex paint of claim 7 wherein $M_w$ of the hydrophilic polyurethane is from 10,000 to 2,000,000.

9. The latex paint of claim 7 wherein said hydrophilic polyurethane comprises at least 90 wt % of the polymerized ethylene oxide units.

10. The latex paint of claim 7 comprising maltodextrin and one of: (i) the dispersant polymer and (ii) a surfactant having HLB>11 and 12 to 100 polymerized units of ethylene oxide.

11. The latex paint of claim 7 wherein the composition further comprises (d) a surfactant having HLB>11 and 12 to 100 polymerized units of ethylene oxide.

\* \* \* \* \*